Feb. 1, 1966 D. KRAMER 3,232,224
ROTARY SCREEN-PRINTING MACHINE
Filed Feb. 27, 1962 6 Sheets-Sheet 1
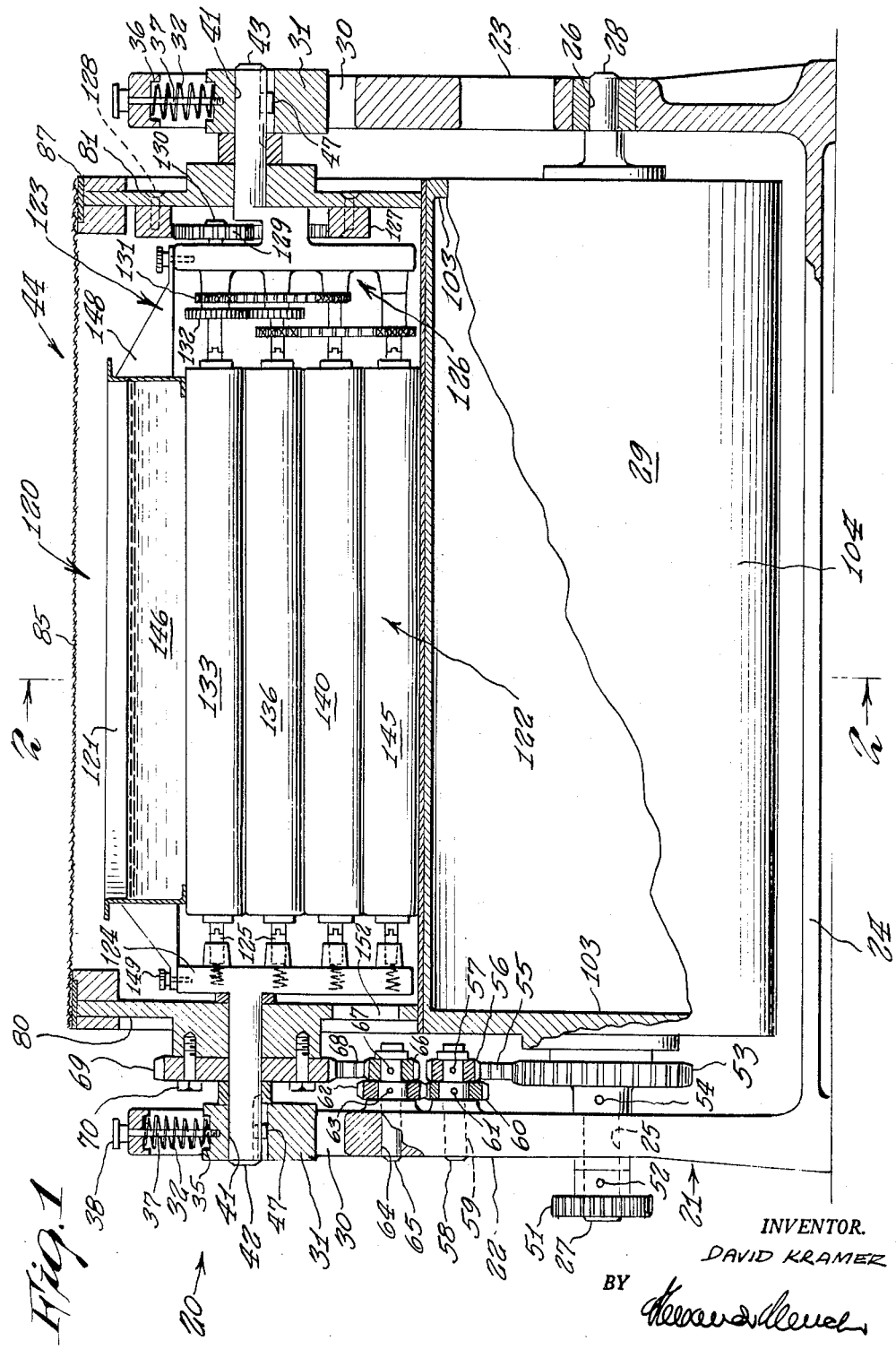
INVENTOR.
DAVID KRAMER
BY
ATTORNEY

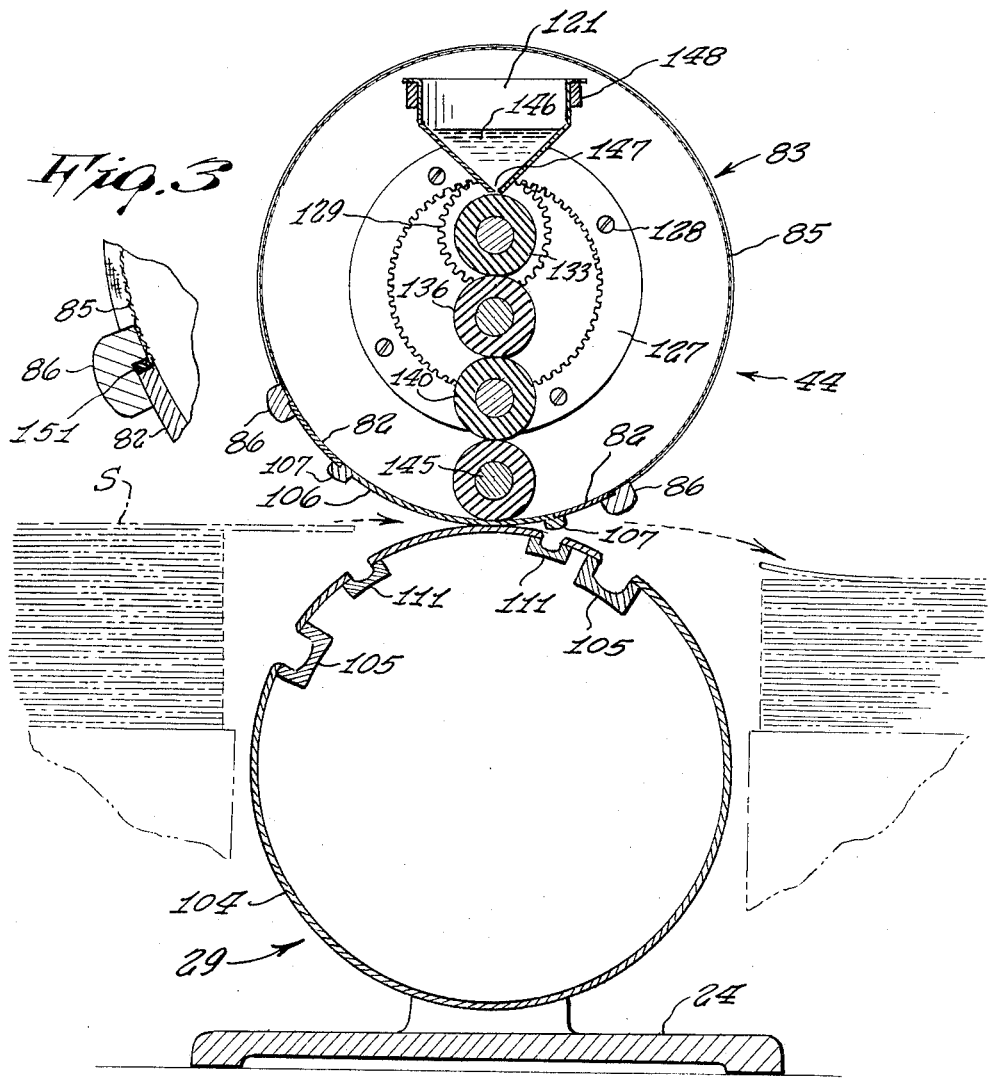

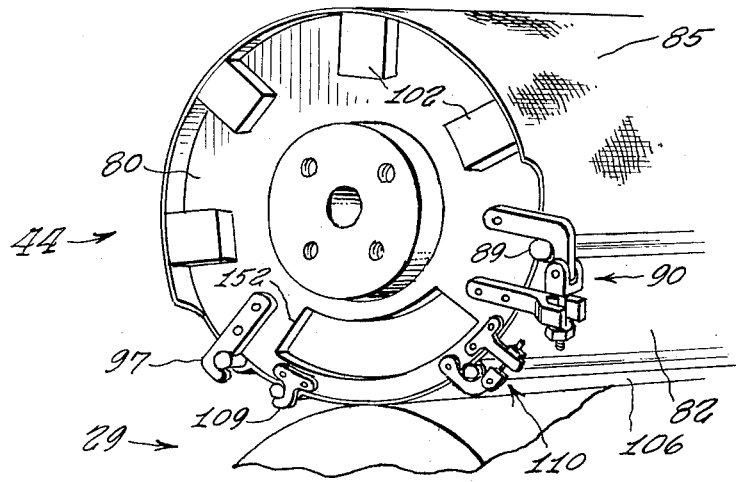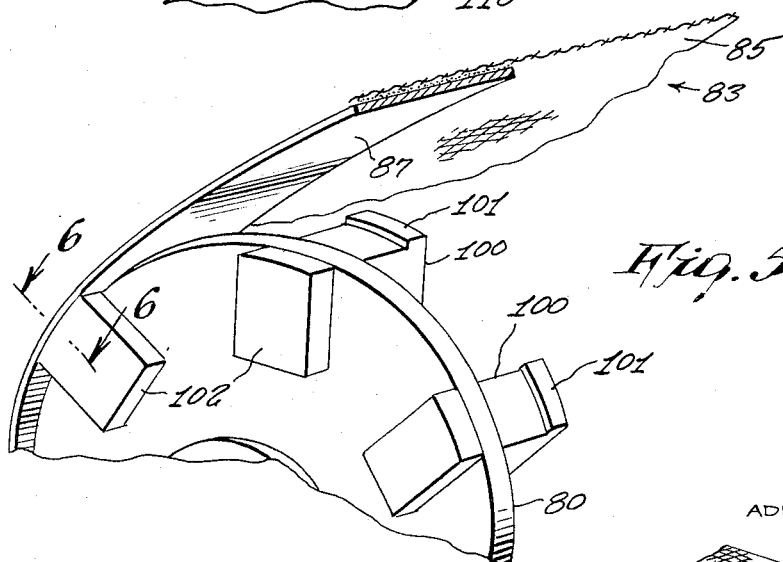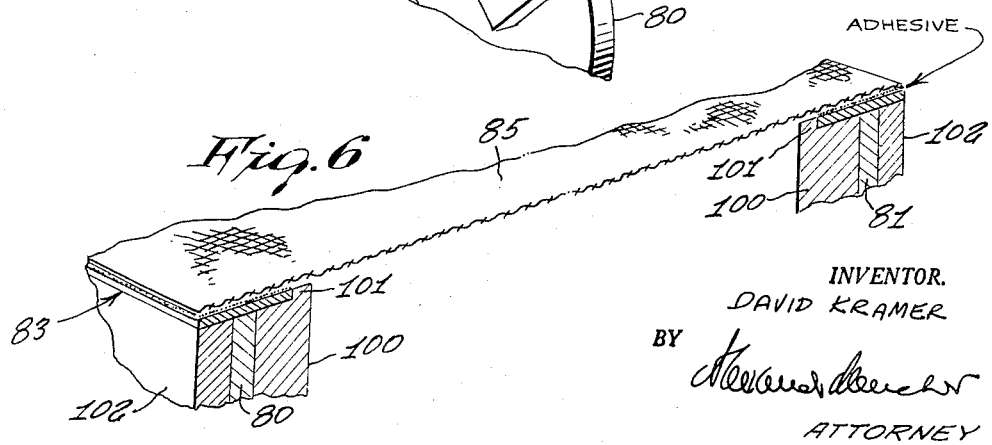

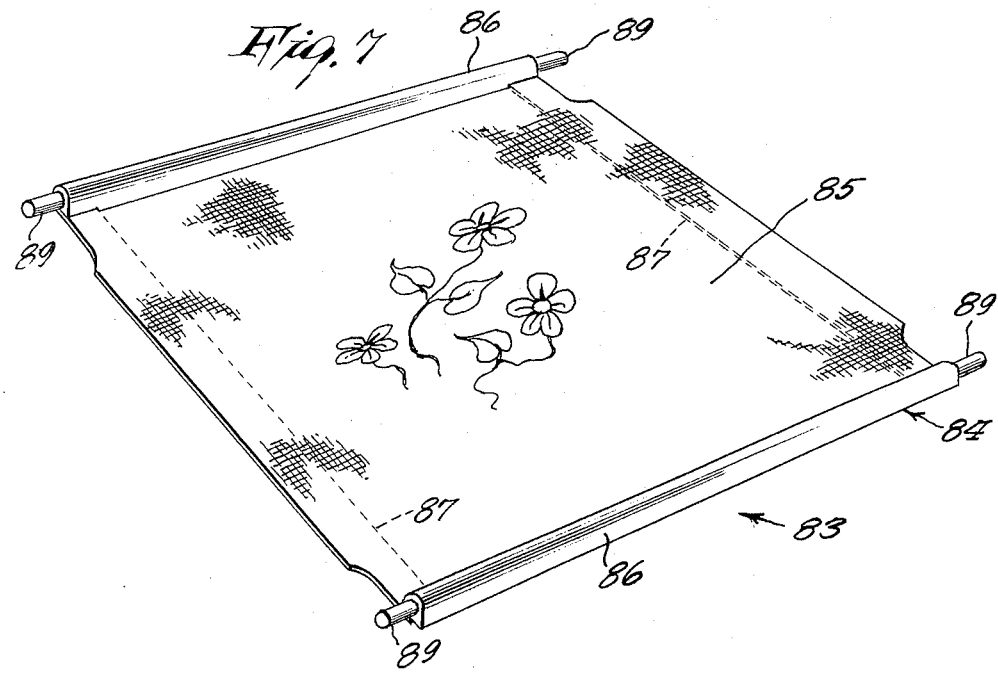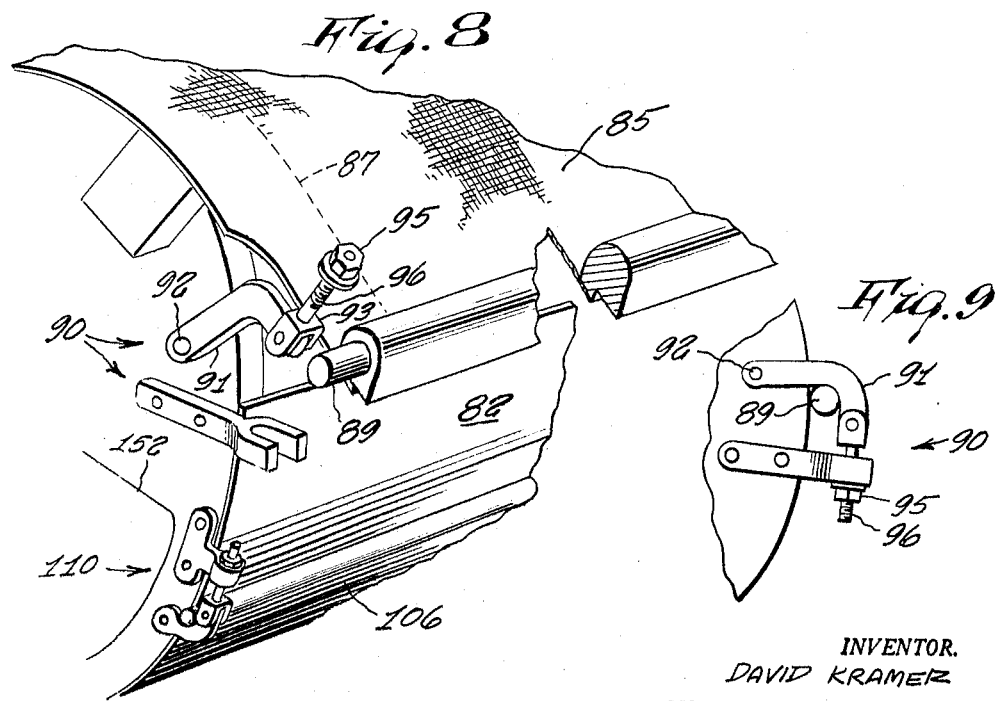

Feb. 1, 1966 D. KRAMER 3,232,224
ROTARY SCREEN-PRINTING MACHINE
Filed Feb. 27, 1962 6 Sheets-Sheet 5
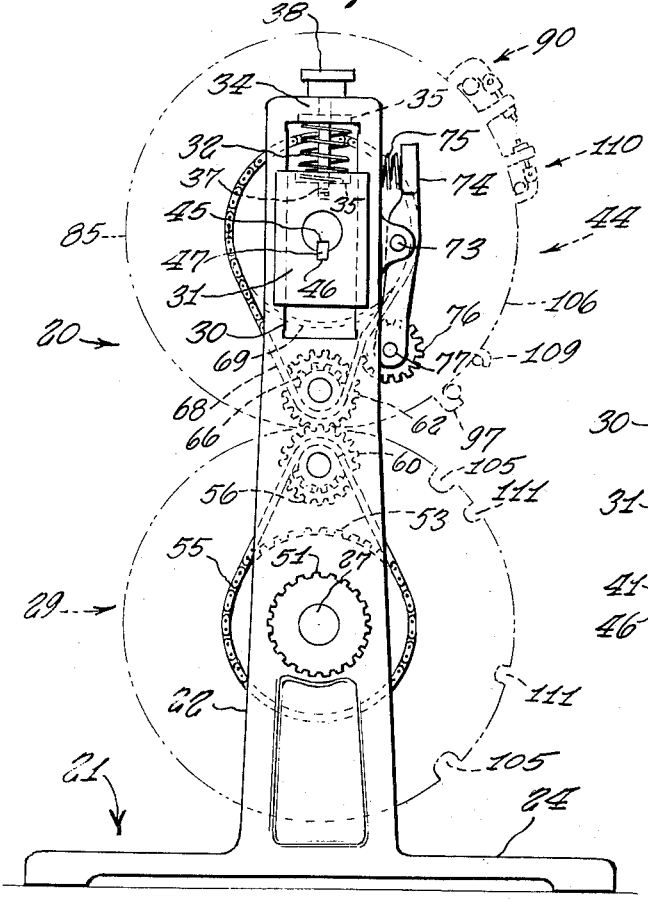
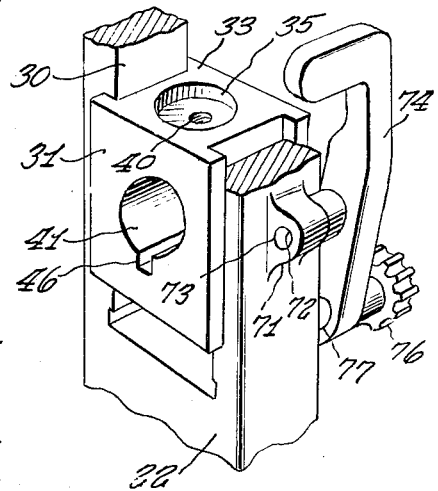
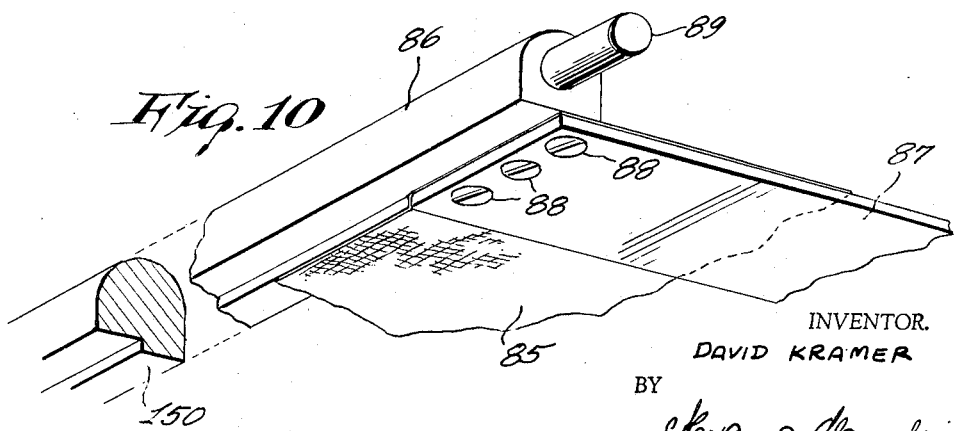
INVENTOR.
DAVID KRAMER
BY
ATTORNEY Feb. 1, 1966  D. KRAMER  3,232,224
ROTARY SCREEN-PRINTING MACHINE
Filed Feb. 27, 1962  6 Sheets-Sheet 6
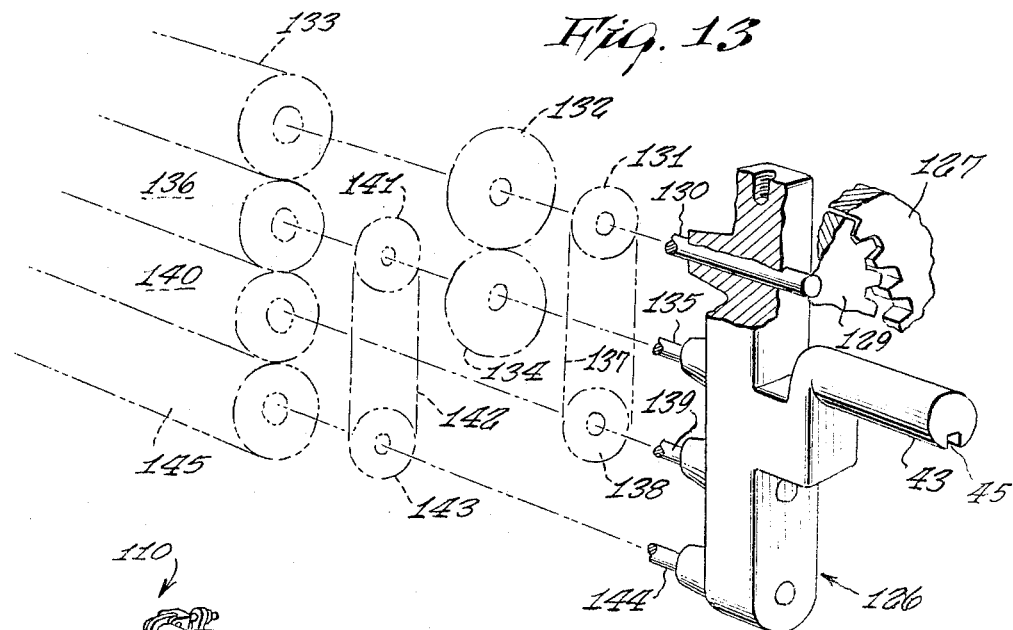
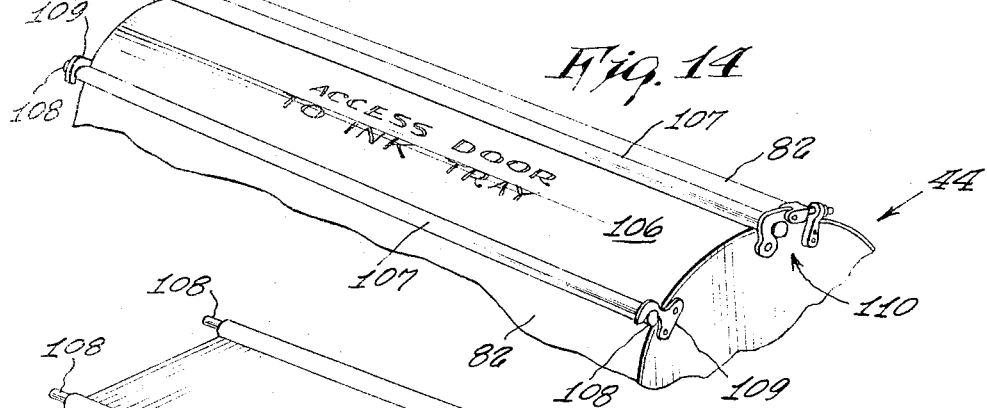
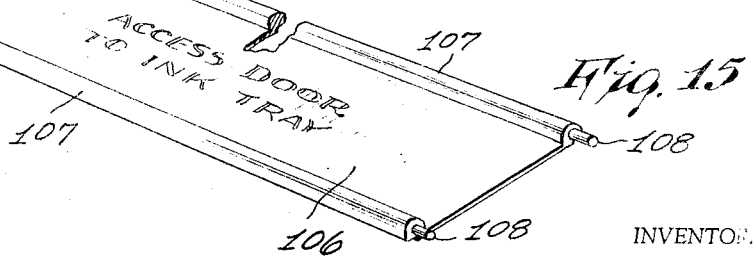
INVENTOR.
DAVID KRAMER
BY
ATTORNEY

United States Patent Office 3,232,224
Patented Feb. 1, 1966

3,232,224
ROTARY SCREEN-PRINTING MACHINE
David Kramer, 78—42 147th St., Flushing, N.Y.
Filed Feb. 27, 1962, Ser. No. 176,015
6 Claims. (Cl. 101—120)

This invention relates generally to printing machinery, but more specifically to printing or duplication machines employing a stencil through which ink is squeezed to form a printed image upon a surface.

Even more specifically, the invention relates to printing machinery employing the silk screen process of printing.

It is well known in the art that silk-screen printing is essentially a slow printing process designed particularly for short run work, and although preparation of the silk screen may be inexpensive total cost of printing is high due to the manual methods employed in the process.

Generally, in industrial silk screen printing the prepared and perforated silk screen is attached to the bottom of a frame or open box and then color of a paste consistency is placed into the frame. One worker may be employed to place the printing stock under the frame and then remove it after printing, replacing it with the next, while another worker works a squeegee in the frame pressing the color through the preforations in the screen. Thus, it is essentially a manual and slow process, often requiring two workers operating together. The present invention intends to overcome some of these obvious objections.

The invention thus applies generally to a rotary silk screen printing machine adapted for continuous rotation in operation, and more specifically to a machine of this type having a hollow printing roller adapted to provide automatic pigment distribution and squeegee operation within the said roller.

A main feature of the invention resides in the provision of a hollow printing roller having a stationary pigment reservoir mounted therewithin and with provision of means for automatic pigment feed, distribution and squeegee operation inside said roller.

A further feature of the invention resides in the provision of a flexible silk screen framework for removable mounting of such screen thereon and wherein the framework is fixed for removable attachment to the printing roller over a window therein.

Another feature of the invention resides in a rotary silk screen printing machine having cylindrical printing and pressure rollers and adapted for continuous opposite rotation for making successive prints.

Another object is to provide an automatic silk screen printing machine that can produce silk screen prints at a greater speed than has heretofore been possible, and which produces prints of greater uniformity than by manual methods.

Another object is to produce silk screen prints, using less labor, thus providing silk screen prints at less cost.

These and other objects will be readily evident upon further study of this specification and the acompanying drawings wherein:

FIGURE 1 is a longitudinal view in section showing the structure of the invention;

FIGURE 2 is a cross-sectional view through plane 2—2 of FIGURE 1;

FIGURE 3 is an enlarged detail view of certain structure shrown in FIGURE 2;

FIGURE 4 is a fragmentary perspective view of the end face of the printing cylinder;

FIGURE 5 is a fragmentary view similar to FIGURE 4 showing the silk screen frame assembly partly in position on the printing cylinder;

FIGURE 6 is a cross-sectional view through plane 6—6 of FIGURE 5;

FIGURE 7 is a perspective view of the underside of the slik screen and frame assembly;

FIGURE 8 is a fragmentary perspective view of structure shown in FIGURE 4 showing how the silk screen frame assembly is fastened to the cylinder;

FIGURE 9 is a fragmentary end view of the lock illustrated in FIGURE 8 and shown in a closed position;

FIGURE 10 is an enlarged bottom perspective view showing a corner of the silk screen frame assembly;

FIGURE 11 is an end view of the machine structure;

FIGURE 12 is a perspective view partly in section of a portion of the structure illustrated in FIGURE 11;

FIGURE 13 is a fragmentary perspective view of the inking mechanism support and showing diagrammatically the gear train;

FIGURE 14 is a perspective view of the ink tray access door mounted thereon;

FIGURE 15 is a perspective view of the ink tray access door shown removed from the cylinder.

Referring now to the drawings in more detail and particularly to FIGURES 1 and 11, reference numeral 20 refers to the assembled machine wherein 21 is a supporting frame having upright standards 22 and 23 formed on base plate 24.

A pair of bearings 25, 26 in the standards are provided to support shafts 27, 28 respectively, extending from the two ends of an impression roller 29 mounted therebetween.

A slot 30, is further provided in each of the standards to receive slide 31 (FIGURES 1, 11 and 12). A spring 32 located between the upper face 33 of the slide and the yoke 34 of the frame normally urges the slide, which is vertically movable, into a downward direction. Seats 35, 36 in the slide and yoke are provided for location of the spring. An adjusting screw 37 having a hand operative knob 38 passes through a free opening 39 in the yoke and is threaded into opening 40 of the slide, thereby permitting adjustment of limit for downward travel of the slide.

A bearing 41 is located in the slide for receiving shafts 42, 43 on the ends of printing roller assembly 44. A keyway 45, 46 in said shafts and slide is fitted with key 47 for the purpose of preventing rotation of the shafts in the bearing.

Shaft 27 of the impression roller 29 has a gear 51 fastened by set screw 52, thereto. A gear chain (not shown in drawing) passes over the said gear and is driven by a motor (also not shown) thus providing means for driving the machine.

Also on shaft 27, a gear 53 fixed thereto by a set screw 54, drives by means of gear chain 55 a sprocket 56 fixed by means of taper pin 57 to shaft 58 which is free-turning in bearing 59 of standard 22. A pinion 60 fixed by taper pin 61 to shaft 58 is in toothed engagement with a pinion 62 fixed by taper pin 63 to shaft 64 which is free-turning in bearing 65 of standard 22. Also on shaft 64, a sprocket 66, fixed thereto by a taper pin 67, drives, by means of chain 68, a gear 69 affixed by screws 70 to the printing roller. (See FIGURES 1, 11.)

Thus it will be apparent that power applied to gear 51 will by means of the above-described gear train, cause the impression roller and the printing roller to rotate in directions opposite to each other, the space between the rollers (if any) being controlled by spring 32 and screw 37.

On one side of standard 22 a boss 71 is located having a bearing 72 for a shaft 73. Attached to the said shaft is a lever 74. A compression spring 75 is located between one end of said lever and the standard thus causing a sprocket 76 held by pin 77 on the other end of the lever to bear against chain 68 thereby taking up any slack in the chain, caused by any vertical movement of the printing roller assembly. (See FIGURES 11 and 12.)

It is now also apparent by the foregoing description that while the printing roller is free to rotate, the shafts on which it is mounted do not rotate.

The rotatable part of the printing roller assembly 44 includes end plates 80, 81 (FIGURE 1) connected together by two permanent and spaced staves 82 (see FIGURES 2, 4, 8 and 14).

A stencil unit 83 comprising a frame 84 and a silk screen 85 is designed to be removably attachable to the printing roller at a location across the opening between the two staves 82 (FIGURES 2, 4, 7 and 8).

As shown in FIGURES 7 and 10, the silk screen is silk fabric covered by varnish and perforated in a conventional manner to produce a picture, text or other design for printing. This silk screen is then in the present invention attached by an adhesive (FIGURES 6, 7 and 10) to the frame comprising rigid bars 86 at opposite sides connected by flexible strips 87 and being held together by detachable screws 88. As shown in FIGURE 10, the screen is fastened to the bottom of bars 86 and to the upper side of strips 87 and is located between the two at the corners where the bars and strips are held together by the screws. The screen is replaceable, hence there is the necessity for screws 88 being removable. The ends of bars 86 are provided with extensions 89 for the purpose of being received into hooks 97 and clamping devices 90 located at the sides of the roller (see FIGURES 4, 8 and 9). These clamping devices may be of any conventional design other than shown in the drawing but are here shown to include a hook member 91 pivoted on pin 92 and having a clevis 93 or similar device to hook on rigid member 94 attached to the end plate. As shown, a nut 95 on threaded post 96 serves to draw the unit tightly against the periphery of the roller end plates, the extensions being first hooked under member 91 (FIGURES 4 and 9).

To maintain the silk screen tight on the roller, blocks 100 having spurs 101 are mounted on the side plates, and the flexible strips fit behind the spurs. Thus the strips are prevented from being drawn toward each other and cause sagging of the silk screen. (See FIGURES 5 and 6.) Blocks 102 on the side plates offer further rigid support for the strips.

It is to be noted that when clamped to the roller, the screen frame bars 86 extend radially outward further than the silk screen or the staves thereby to permit the printing roller and the impression roller to rotate in close contact with each other. The following provision is made to accommodate the bars. The impression roller 29 comprised of end walls 103 and cylinder 104 has a channeled member 105 interrupt the arced outer contour of the cylinder at such places where the bars meet the impression roller. Thus recessed space on the lower roller is provided to permit the protrusion on the upper roller to pass by, and yet permit the rollers to work together in close proximity (see FIGURE 2).

Also on the printing roller, an access door 106 is located (FIGURES 2, 14 and 15) for the purpose of allowing entry into the printing roller for reasons to be explained later in this description. Door 106 is made of flexible sheet metal with the legend as indicated in FIGURES 14 and 15 imprinted thereon. This door is provided with structure similar to the stencil frame, having rigid bars 107 with extensions 108 which fit into hook 109 and clamping devices 110 of possibly similar design as those used for the stencil frame. Likewise similar type channels 111 in the peripheral surface of the impression roller 29 are provided to permit bars 107 to pass.

Impression roller 29 may be designated "pressure" roller and is denominated as such in the claims. Wherever "ink" is used herein, it is understood to also embrace pigment.

The printing roller assembly is designed to be a self-contained unit having an ink or pigment reservoir for supply to the silk screen and having distribution and squeegee means for transferring the image to the item to be printed.

Within the interior of the printing roller, there is provided an inking unit 120 which is rigidly fixed to the stationary shafts 42, 43 (as will appear hereafter) so to remain in an upright manner while a printing roller rotates around it. The inking or pigment unit is comprised of a tray 121, a series of transfer rollers generally indicated by numeral 122 and gearing generally indicated by numeral 123 to motivate them. (See FIGURES 1 and 2.)

Shaft 42 is an integral part of the frame 124 which provides bearings for stub shafts 125 and serves as a support for one end of ink or pigment tray 121.

Likewise shaft 43 is an integral part of the frame 126 within the roller which serves to support the other end of the tray and also supports the gears that turn the rollers 122.

On the interior side of end plate 81, an internal gear 127 is mounted by screws 128. In toothed engagement therewith, a gear 129 is mounted on shaft 130 held for rotation in frame 126. Also mounted on shaft 130 are a sprocket 131 and pinion 132 (see FIGURES 1 and 13).

The end of shaft 130 is clutch toothed. Likewise ends of stub shafts 125 are clutch toothed. Shafts 125 are retractable by force, being spring loaded. Thus, a printing ink roller 133 may be readily inserted between the shaft ends.

Pinion 132 is in toothed engagement with a pinion 134 on shaft 135 and serves to drive ink or pigment roller 136 in reverse direction. Sprocket 131 by means of chain 137 drives sprocket 138 on shaft 139 and drives ink or pigment roller 140 in the same direction as ink or pigment roller 133. A sprocket 141 on shaft 135 drives by means of chain 142 a sprocket 143 on shaft 144 and serves to drive roller 145 in a direction similar to ink or pigment roller 136. All the ink or pigment rollers are readily removable and replaceable as described above.

Tray 121 containing ink or pigment 146 has a slot 147 along its bottom permitting ink pigment to drain upon roller 133. The ink or pigment rollers, being in surface engagement with each other, permit the ink to spread more uniformly over the surface of each successive roller.

Thus the rotation of printing roller 44 motivates the internal gear train that transfers a thinly spread film of ink to the lowermost ink roller 145 which serves as a distributor and squeegee for screen 85.

It is to be here noted that tray 121 may be held in a frame 148 and can be readily removed and replaced by another tray having a different color of ink or pigment by simply opening up the access door 106.

Frame 148 is fastened by screws 149 to frames 124, 126.

Roller 145 acting as stated as both squeegee and distributor is in contact engagement with the interior surface of the printing roller and the silk screen as the latter moves therebeneath.

As shown in FIGURE 3, the interior surface of the printing roller cylinder and the silk screen are made flush with each other as well as with the access door (FIGURE 2) thereby producing a smooth deposit of ink or pigment upon the silk screen. Bars 86 are thus designed with step 150 so that the silk screen may be flush-mounted as stated. A gasket 151 (as shown only in FIGURE 3) may or may not be used to aid in preventing ink from seeping out of the cylinder interior between the junction of the staves and the silk screen frame. The same gasket design could, of course, be applied to the access door edge likewise.

A side opening 152 may be provided in face plate 80 so as to permit a ready viewing of the interior of the printing roller cylinder without need of removing the access door.

In operation, a prepared silk screen is attached to a frame and the frame is then locked to the printing roller. Ink or pigment is placed into the ink tray through the access door which is then replaced on the roller. Power then is applied to gear 51 which causes the pressure roller and the printing roller to revolve in directions opposite to each other. At the same time, the rotating printing cylinder transmits power to rotate the ink rollers within, thus transferring ink or pigment to the underside of the silk screen. Printing stock S (FIGURE 2) can then be fed by automatic or other means between the rollers, the printed stock being deposited on the opposite side of the machine as shown. In case of a thicker stock entering the machine, the printing roller will be lifted accordingly to accommodate it.

It is understood that the assembly of rollers 133, 136, 140 and 145 serving feed distributor and squeegee functions may be substituted by equivalent elements such as a stationary straight strip mounted inside the printing roller and aligned with an element of the cylindrical internal surface for distribution and forcing of ink or pigment inside the roller along and through the screen.

While various changes may be made in the detail construction, it is understood that such changes are within the spirit of the present invention and within the scope of the claims.

I claim:

1. In a rotary silk screen printing machine, the combination of a supporting framework, a rotatable hollow cylindrical printing roller having a silk screen and an access door each arcuately mounted on the periphery and across respective openings thereof, bar means on the longitudinal edges of said screen and of said door projecting beyond the periphery of said printing roller and for removable attachment thereto, a rotatable cylindrical pressure roller having respective longitudinal channels to receive and accommodate the said bar means of the screen and door and spaced from and aligned with said printing roller for continuous feeding of printable material therebetween, means to move said rollers in opposite directions, a stationary pigment reservoir mounted adjacent the upper end, inside of and for vertical gravity feeding of pigment with respect to; the printing roller, a plurality of driven rollers within the printing roller and the printing roller having means to drive said driven rollers for receiving, distributing and forcing said pigment through the screen for printing on said material.

2. In a rotary silk screen printing machine as set forth in claim 1 wherein the stationary pigment reservoir has a bottom opening and is mounted along the vertical diameter adjacent to the upper end of and inside the printing roller and wherein the driven rollers are in alignment with said reservoir for gravity feed to the uppermost driven roller.

3. In a rotary silk screen printing machine as set forth in claim 1 wherein the plurality of driven rollers consists of a series of rollers between the reservoir and the innerside of the printing roller, the uppermost roller receiving pigment from the reservoir, the intermediate rollers transferring same to the lowermost roller for distribution to and forcing through the screen for printing on said material.

4. In a rotary silk screen printing machine as set forth in claim 1 wherein the printing roller is comprised of a cylindrical framework and wherein the arcuately mounted silk screen comprises a flexible frame including said bar means having the screen removably mounted thereon, said frame being arcuately flexed for removable mounting on the framework.

5. In a rotary silk screen printing machine as set forth in claim 1 wherein the printing roller is comprised of a cylindrical framework having end walls and spaced stave members therebetween and wherein the arcuately mounted silk screen comprises a flexible frame including said bar means having the screen removably mounted thereon, said frame being arcuately flexed for removable mounting to said staves.

6. In a rotary silk screen printing machine the combination of a supporting framework, a rotatable hollow cylindrical printing roller having a silk screen arcuately mounted on the periphery and across an openng thereof, bar means on the longitudinal edges of said screen projecting beyond the periphery of said printing roller for removable attachment thereto, a rotatable cylindrical pressure roller having channels to accommodate said bar means and spaced from and aligned with said printing roller for continuous feeding of printable material therebetween, means to move said rollers in opposite directions, a stationary pigment reservoir mounted adjacent the upper end, inside of and for vertical gravity feeding of pigment with respect to the printing roller, a plurality of driven rollers within the printing roller and the printing roller having means to drive said driven rollers for receiving, distributing and forcing said pigment through the screen for printing on said material.

References Cited by the Examiner

UNITED STATES PATENTS

| | | | |
|---|---|---|---|
| 553,805 | 1/1896 | Deckert | 101—120 |
| 606,878 | 7/1898 | Rouse | 101—120 |
| 628,651 | 7/1899 | Cummings | 101—120 |
| 1,764,669 | 6/1930 | Wright | 101—116 X |
| 2,071,824 | 2/1937 | Engert | 101—116 |
| 2,180,135 | 11/1939 | Bartholomew | 101—119 |
| 2,511,511 | 6/1950 | Murphy | 101—120 |
| 2,928,340 | 3/1960 | Stein et al. | 101—120 |

DAVID KLEIN, *Primary Examiner.*